Feb. 1, 1949.        L. B. COURTOT         2,460,621
                       TUBE COUPLING
                    Filed July 10, 1945

INVENTOR.
LOUIS B. COURTOT
BY Richey & Watts
ATTORNEYS

Patented Feb. 1, 1949

2,460,621

UNITED STATES PATENT OFFICE 2,460,621

TUBE COUPLING

Louis B. Courtot, Cleveland, Ohio, assignor to The Weatherhead Company, Cleveland, Ohio, a corporation of Ohio Application July 10, 1945, Serial No. 604,163

6 Claims. (Cl. 285—122)

My invention relates to tube couplings and fittings and concerns particularly couplings of the cutting sleeve type for making joints with smooth surfaced tubing.

An object of my invention is to provide an improved tube coupling requiring the stocking of a minimum number of separate parts.

A further object is to provide a fitting or a tube coupling employing a cutting sleeve or cutting ring without requiring the stocking of separate cutting rings.

A further object of the invention is to provide a fitting for a tube coupling in which the cutting ring is originally integral with the fitting, but is separated by the operation of joining a tube with the fitting.

A further object of the invention is to provide for making a joint with a smooth surfaced tube by merely inserting the end of such a tube into the fitting without the necessity for a preparation of the tube or placing any parts upon the tube before the joint is made.

Other and further objects, features and advantages of the invention will become apparent as the description proceeds.

In carrying out the invention in accordance with a preferred form thereof, I provide a fitting or a body having a tube-receiving bore and having a cutting ring formed integrally with the body, co-axial therewith, so that in inserting the tube within the bore in the body, it is also inserted within the cutting ring. Suitable mechanism for shearing the cutting ring and pressing it into the tube and securing it against the body is provided which may take the form of a tube nut adapted to be screwed on to the fitting.

A better understanding of the invention will be afforded by the following detailed description considered in conjunction with the accompanying drawing in which, Fig. 1 is a longitudinal, medial sectional view of an embodiment of the invention showing the arrangement of parts before the joint between the inserted tube and the tube-receiving body has been made, with the cutting ring or cutting sleeve still integral with the tube receiving body;

Like reference characters are utilized throughout the drawing to designate like parts.

Figure 1:
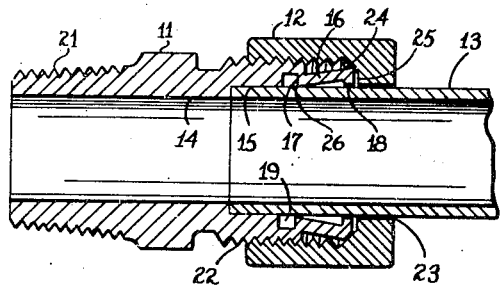

As illustrated in Fig. 1 a two-part fitting comprising a body 11 and a tube nut 12 is employed for joining a smooth surfaced tube 13 to the body 11.

The body 11 comprises a main portion having a bore 14 with a counter-bored portion 15 adapted to receive the end of the tube 13. It also comprises a portion 16 co-axial with the bore 14 in the form of a cutting ring having a forward end joined by a narrow band of metal 17 to the main portion of the body 11, and having a rear portion 18 inwardly flanged to form a rear cutting edge. To facilitate shearing the cutting sleeve 16 along the junction 17, an annular notch or groove of rectangular cross-section 19 is provided between the throat of the bore 14 and the cutting sleeve 16.

The body 11 has a pipe thread 21 whereby it may be joined to a bulkhead or the like and has a screw thread 22 for receiving the nut 12.

The nut 12 may be a conventional tube nut having an opening 23 for the tube 13 and having a beveled inner surface 24 adapted to engage the rear end of the cutting sleeve 16.

The body 11 and the tube nut 12 are the only two parts which need to be stocked in the warehouse. If desired they may be stocked assembled with the nut 12 screwed loosely on the thread 22. When a joint is to be made between the body 11 and a smooth tube 13, the tube nut 12 having been assembled with the body 11, the end of the tube 13 is inserted through the nut 12, the cutting sleeve portion 16 of the body 11, and the counter bore 15. The tube nut 12 is then tightened on the thread 22 until the beveled surface 24 begins to bear inward on the rear end of the cutting sleeve 16. Tightening the nut 12 also causes the cutting sleeve 16 to be driven forward applying shearing force to the junction 17 until the cutting ring or sleeve 16 is sheared from the throat portion of the body 11, as illustrated in Fig. 2.

The square surfaced portion 25 of the tube nut 12 serves to provide adequate forward thrust as the nut 12 is being tightened up. Preferably the forward end of the cutting sleeve 16 has a relatively sharp corner 26. The corner 26 is driven into the surface of the tube 13 to form an indentation or notch 27 therein, as illustrated in Fig. 2, owing to the fact that the cutting sleeve 16 enters at a slight angle because the outer end is raised by the flange 18. The application of forward pressure by the nut 12 also tends slightly to buckle the sleeve 16 thus aiding the action of both the forward point 26 and the flange 18 in being driven inward against the tube 13. Consequently not only the forward point 26, but also the flange 18, produces a gouging of the tube 13, which is held by the notches 27 and 28 at the forward and rear ends of the cutting sleeve 16.

Figure 2:
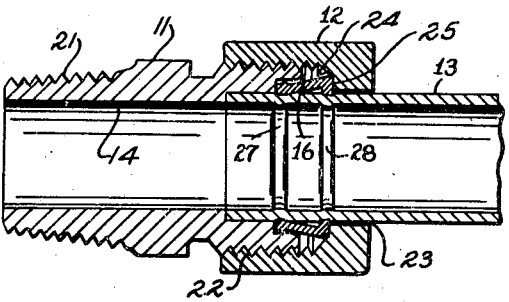
Fig. 2 is a view corresponding to Fig. 1 showing the arrangement of parts where the connection has been completed with the cutting sleeve sheared from the tube-receiving body and caused to bite into the tube for securing it.
Figure 3:
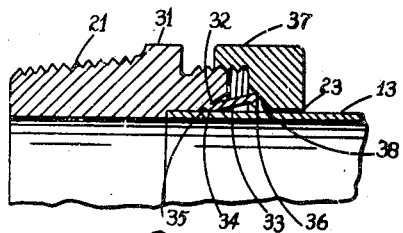
Fig. 3 is a fragmentary longitudinal sectional diagram representing a tube coupling embodying my invention in which the body is provided with a flaring mouth showing the arrangement of parts before the cutting sleeve has been sheared from the body.
Figure 4:
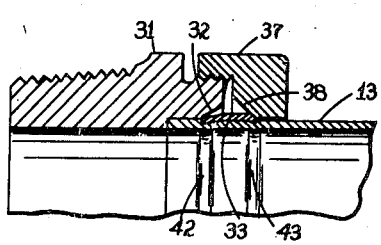
Fig. 4 is a view corresponding to Fig. 3 illustrating the arrangement with the cutting sleeve sheared from the body and the tube secured thereby.

In the arrangement of Figs. 1 and 2, the body 11 has a throat with a square edged opening and the cutting sleeve 16 has a flange 18 which is relatively square-edged. However, the invention is not limited to the specific arrangement illustrated in Figs. 1 and 2. For example, as illustrated in Figs. 3 and 4, I may employ a body 31 having a flaring throat with a taper 32, and with a cutting ring portion 33 integral with the body 31, having a junction 34 in the throat of the flare or taper 32. Preferably the material is weakened by forming an annular notch 35 just within the junction 34. As illustrated in Fig. 3 the cutting sleeve 33 has a sharpened rear end flange 36. In this case, a tube nut 37 is preferably employed in which there is a tapered inner surface 38 in which the bevel continues down to the outer surface of the tube 13.

As illustrated in Fig. 4 the tube 13 is secured in the body 31 by drawing up the nut 37. The combination of the forward component of force as the nut 37 is tightened and the inwardly bending component of force causes a fracture at the junction 35, so that the cutting ring 33 is severed from the body 31, and is caused to bite into the outer surface of the tube 13 for securing the same. Notches 42 and 43 are formed in the tube 13 at the forward and rear ends of the cutting sleeve 33 by reason of the action of the tapered surfaces 32 and 36 in forcing the ends of the cutting sleeve 33 inward against the tube 13.

Figure 5:
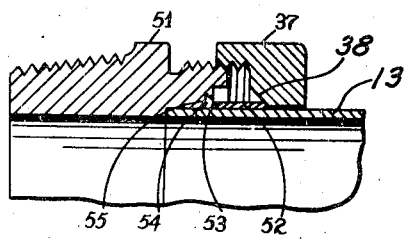
Fig. 5 is a fragmentary longitudinal sectional view of a tube coupling employing a flat cutting sleeve integral with the body before the cutting sleeve has been sheared from the body.
Figure 6:
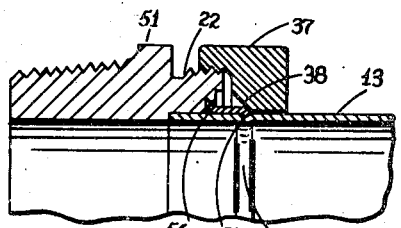
Fig. 6 is a view corresponding to Fig. 5 illustrating the arrangement of parts after the cutting sleeve has been sheared and caused to bite into the tube for securing it.

In connection with Figs. 1 to 4, arrangements have been described employing a cutting sleeve which is initially integral with a tube-receiving body and which has a flanged rear end in order to insure biting into the tube at the rear end of the cutting sleeve. However my invention is not limited to the use of such cutting sleeves with flanged ends. For example, as illustrated in Figs. 5 and 6, I may employ a tube-receiving body 51 having a cutting sleeve 52 originally integral therewith which is relatively flat, preferably with squared ends and having a relatively weak junction 53 between the cutting sleeve 52 and the throat of the body 51. A deep annular notch 54 may be provided in the throat of the body 51 to insure sufficient frangibility of the junction 53. The surface 55 of the annular notch 54 is preferably substantially perpendicular to the bore axis in order to prevent the forward end of the cutting sleeve from being deflected into the tube 13. In this case, a tube nut 37 may be employed which is substantially the same in shape as illustrated in connection with Figs. 3 and 4.

When the tube nut 37 is tightened on the thread 22 in order to secure the tube 13 in the body 51, the cutting sleeve 52 is sheared from the body 51 at the junction 53 and the forward end 56 of the cutting sleeve tends to be deflected outward into the notch 54 whereas the rear end 57 is forced to bite into the outer surface of the tube 13 by the beveled surface 38 on the nut 37, thus forming a single notch or seat 58 in the tube 13.

I have herein shown and particularly described certain embodiments of my invention and certain methods of operation embraced therein for the purpose of explaining its principle of operation and showing its application, but it will be obvious to those skilled in the art that many modifications and variations are possible, and I aim, therefore, to cover all such modifications and variations as fall within the scope of my invention which is defined in the appended claims.

What is claimed is:

1. A tube coupling comprising a body adapted to receive a tube and having a tube sealing ring frangibly disposed integral with said body, and a tube nut for shearing said ring from said body and forcing it into engagement with a tube to be received in the body, said body having a recess adjacent said frangible connection whereby the sheared end of the ring can move axially and radially as it is sheared from the body.

2. A tube receiving body for a tube coupling, said body having a tube receiving bore and a sealing ring substantially co-axial with said bore and integral with said body, said ring being joined to the body so that the joint shears in response to axial pressure.

3. In combination, a body for a tube coupling, said body having a tube-receiving bore and a tube sealing ring initially cylindrical in shape and coaxial with said bore and integral with the remainder of said body and a tube nut adapted to be drawn against said body, said tube nut having a tapered recess adapted to engage the rear end of the sealing ring as the nut is drawn against the body for contracting said rear end of the sealing ring to engage a tube received in the body.

4. A tube receiving body for a tube coupling, said body having a tube receiving bore and a sealing ring substantially co-axial with said bore and integral with said body, said ring being joined to the body so that the joint shears in response to axial pressure, said ring having a generally radially inwardly directed flange spaced from its joint to the body for gripping an associated tube after the joint has sheared.

5. A tube receiving body for a tube coupling, said body having a tube receiving bore and a sealing ring substantially co-axial with said bore and integral with said body, said ring being joined to the body so that the joint shears in response to axial pressure, said ring being substantially cylindrical.

6. In combination, a body for a tube coupling, said body having a tube receiving bore and a tube sealing ring initially integral with the remainder of said body and having a radially inwardly directed flange adjacent its rear end, and a tube nut adapted to be drawn against said body, said tube nut not having a tapered recess adapted to engage the rear end of the sealing ring as the nut is drawn against the body for contracting said rear end of the sealing ring to engage a tube received in the body.

LOUIS B. COURTOT.

REFERENCES CITED

The following references are of record in the file of this patent:

UNITED STATES PATENTS

| Number | Name | Date |
|---|---|---|
| 1,581,538 | Hill | Apr. 20, 1926 |
| 1,755,210 | Dohner | Apr. 22, 1930 |
| 1,889,778 | Dobrick | Dec. 6, 1932 |
| 2,255,673 | McDermott | Sept. 9, 1941 |